(12) United States Patent
Schwarzler

(10) Patent No.: US 6,505,793 B2
(45) Date of Patent: Jan. 14, 2003

(54) ACTUATION SYSTEM AND METHOD FOR A LOAD-BEARING PARAGLIDER

(75) Inventor: Hans-Jürgen Schwarzler, Taufkirchen (DE)

(73) Assignee: EADS Deutschland GmbH, Munich (DE)

( * ) Notice: Subject to any disclaimer, the term of this patent is extended or adjusted under 35 U.S.C. 154(b) by 0 days.

(21) Appl. No.: 09/736,008

(22) Filed: Dec. 13, 2000

(65) Prior Publication Data

US 2001/0004097 A1 Jun. 21, 2001

(30) Foreign Application Priority Data

Dec. 15, 1999 (DE) .......................... 199 60 332

(51) Int. Cl.$^7$ ............................. B64D 17/34
(52) U.S. Cl. ...................... 244/142; 102/152; 102/900; 102/138 R
(58) Field of Search ................ 244/152, 142, 244/151 B, 149, 145, 138, 138 R, 900, 902

(56) References Cited

U.S. PATENT DOCUMENTS

| | | | | |
|---|---|---|---|---|
| 3,117,753 A | * | 1/1964 | Ewing | 244/152 |
| 3,146,976 A | * | 9/1964 | Houdou | 244/142 |
| 3,433,441 A | * | 3/1969 | Cummings | 244/142 |
| 3,468,502 A | * | 9/1969 | Kinney | 244/152 |
| 3,773,284 A | * | 11/1973 | Matsuo et al. | 244/142 |
| 4,440,366 A | * | 4/1984 | Keeler et al. | 244/152 |
| 4,776,538 A | * | 10/1988 | Ravnitzky | 244/152 |
| 4,865,274 A | * | 9/1989 | Fisher | 244/152 |
| 5,094,405 A | * | 3/1992 | Brum | 244/152 |
| 5,102,063 A | * | 4/1992 | Brum | 244/152 |
| 5,678,788 A | * | 10/1997 | Hetzer et al. | 244/152 |
| 5,884,867 A | * | 3/1999 | Gordon et al. | 244/152 |
| 5,899,415 A | | 5/1999 | Conway et al. | 244/152 |
| 6,131,856 A | * | 10/2000 | Brown | 244/152 |

FOREIGN PATENT DOCUMENTS

| | | | | |
|---|---|---|---|---|
| DE | DAS1133253 | * | 7/1962 | 244/152 |
| DE | 3309698 A1 | * | 9/1984 | 244/138 R |
| DE | 4336056 A1 | * | 4/1995 | 244/138 R |
| DE | 4433211 | | 1/1996 | |
| DE | 19610052 | | 9/1997 | |
| DE | 19634017 | | 2/1998 | |

OTHER PUBLICATIONS

NASA Tech Brief, Dec. 1967, NASA, Brief 67–10677, Category 05.*

* cited by examiner

*Primary Examiner*—Michael J. Carone
*Assistant Examiner*—Lulit Semunegus
(74) *Attorney, Agent, or Firm*—Ladas & Parry

(57) ABSTRACT

A bearing and control system to execute flaring and curved flight manoeuvres of a load-bearing paraglider (1) with a parachute (2) with trailing edges (9, 9a, 9b) to execute the manoeuvre, whereby control lines (10) connected to trailing edges are rolled onto an unrolling device (16, 172), with a load unit (3) and with an unrolling device (12a, 173) to unroll lift webs (174) wound on it to lower the load unit (3), whereby the trailing edges (9, 9a, 9b) are moved to execute a manoeuvre by the weight of the load unit (3), and a gear unit (171) and a brake (178, 179) are between the control lines (10) and the load unit (3).

8 Claims, 12 Drawing Sheets

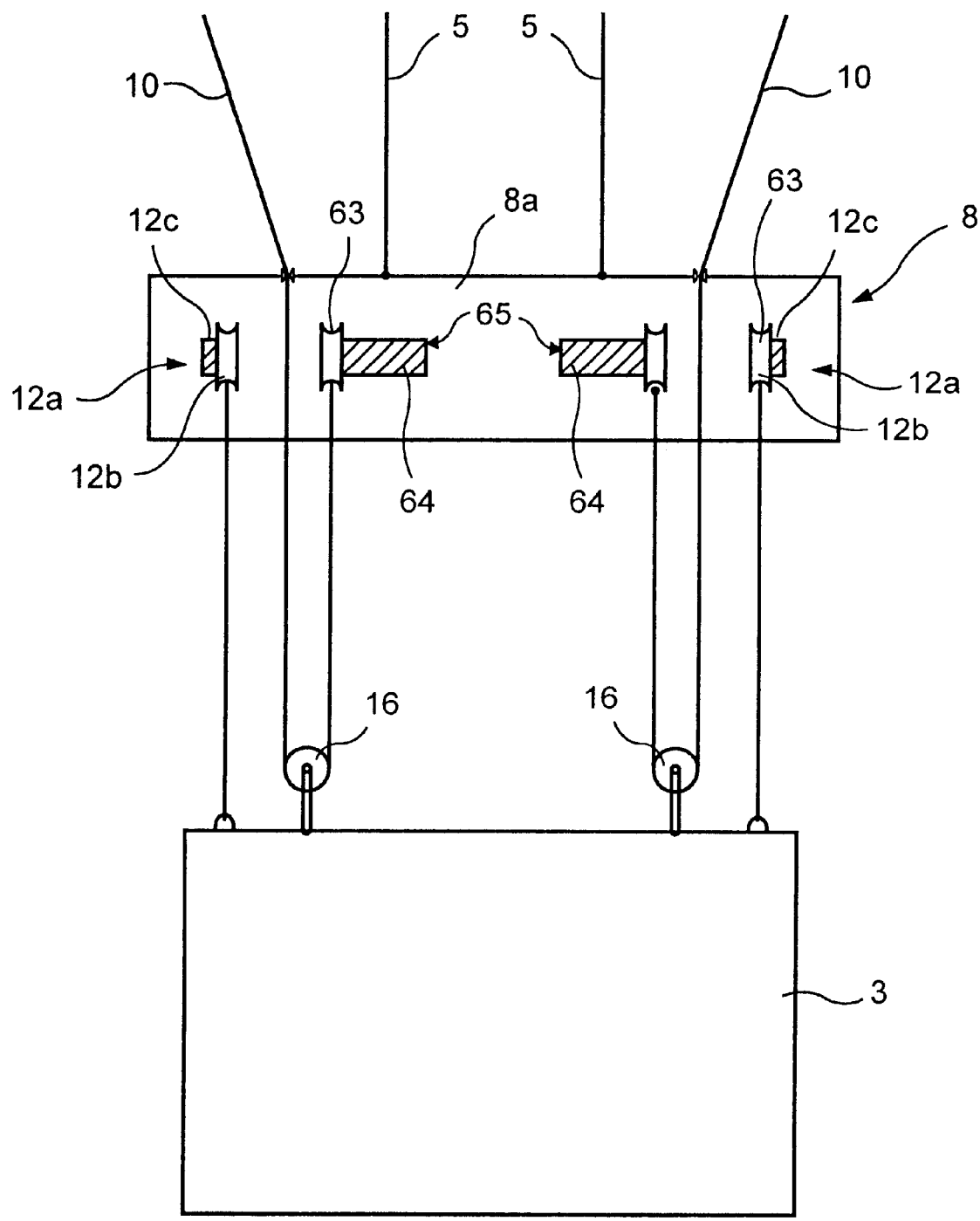
F I G. 4

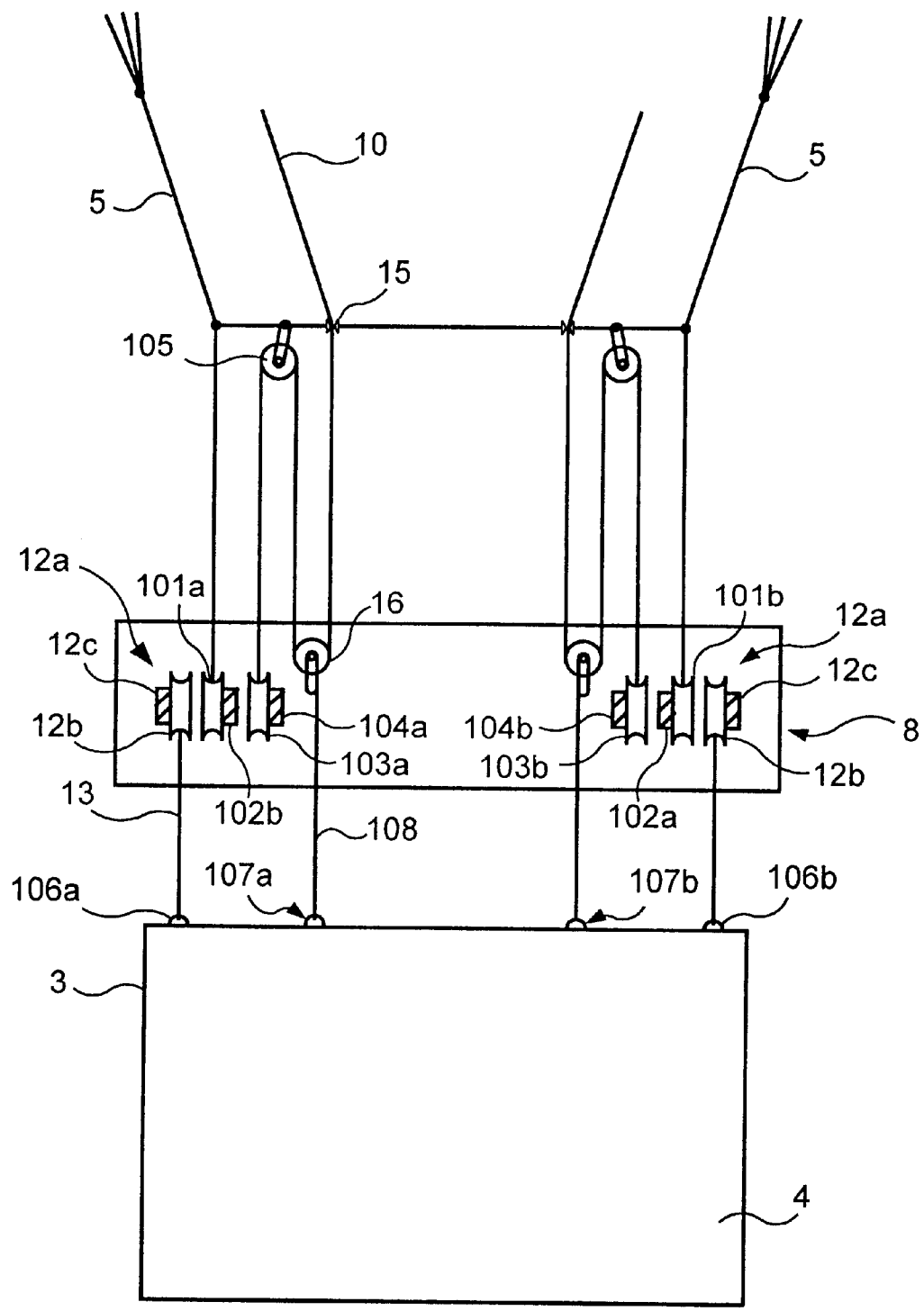
F I G. 8

|  | 12c | 103a<br>104a | 103b<br>104b |
|---|---|---|---|
| LEFT STEERING | RELEASED | LOCKED | RELEASED |
| STOP LEFT STEERING | LOCKED | RELEASED | LOCKED |
| RIGHT STEERING | RELEASED | RELEASED | LOCKED |
| STOP RIGHT STEERING | LOCKED | LOCKED | RELEASED |
| FLARE | RELEASED | LOCKED | LOCKED |
| STOP FLARE | LOCKED | RELEASED | RELEASED |

FIG. 9

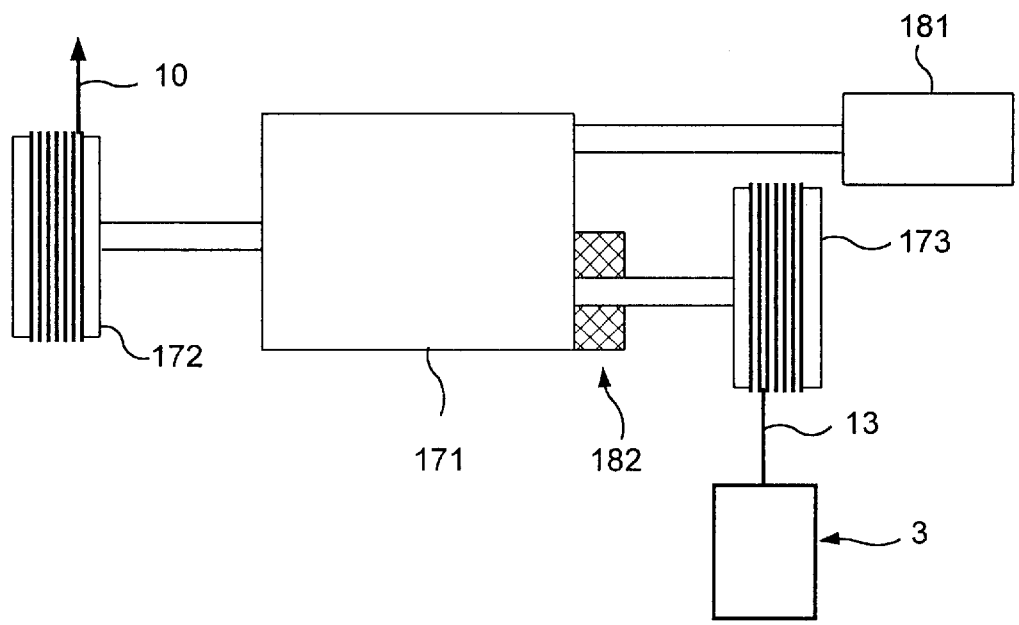
F I G. 14
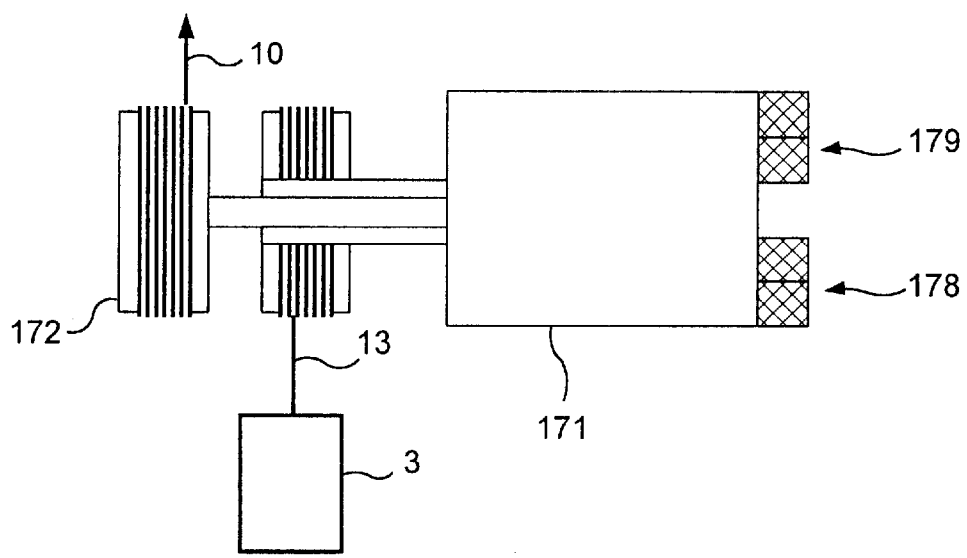
F I G. 15

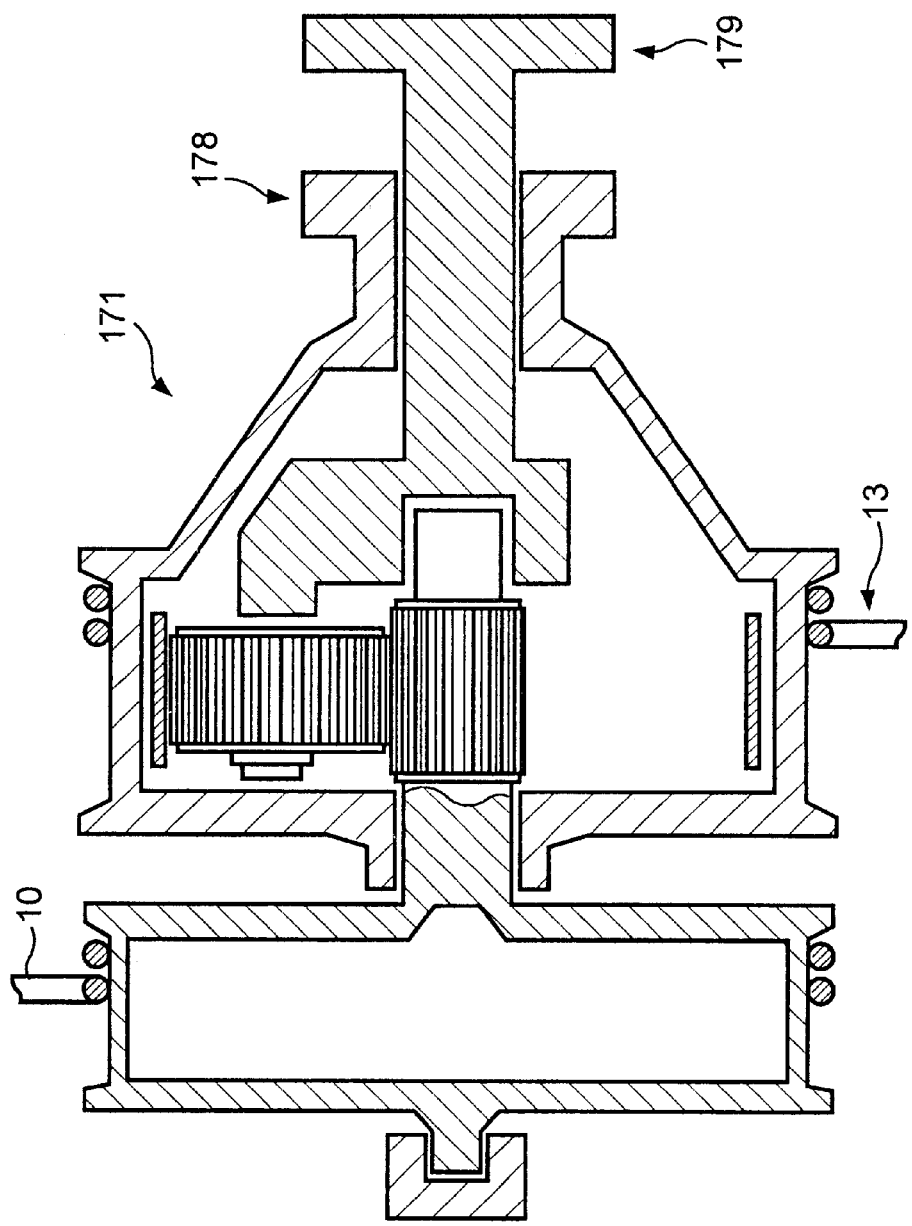
F I G. 16

ACTUATION SYSTEM AND METHOD FOR A LOAD-BEARING PARAGLIDER

FIELD OF THE INVENTION

The invention concerns an actuation system for flaring and controlling a load-bearing paraglider and a method to implement it.

BACKGROUND

Such load-bearing paragliders can be used to deposit large loads e.g. from aeroplanes or to land manned or unmanned aircraft or aeroplanes. The control elements of paragliders that carry comparatively large loads are exposed to comparatively large control forces and comparatively long control paths. State-of-the-art actuators used to control such load-bearing paragliders are control units with electrical motors and winches that are fed by a battery. A disadvantage of the provided actuation systems is that they only apply limited power and force to control the paraglider. Another disadvantage of the load-bearing paragliders with a controller or actuator is that the actuator comprises a relatively large amount of the overall weight of the entire system consisting of the load-bearing paraglider and controller/actuator, so that the useful load borne by the paraglider must be reduced, or the load-bearing paraglider must be relatively large. Another disadvantage of state-of-the-art load-bearing paragliders is that the utilised controllers/actuators are relatively expensive. This is particularly disadvantageous since the entire system is lost when used for military purposes. Another disadvantage of prior-art load-bearing paragliders is that the energy store (battery) has a limited capacity which makes the precise placement of the load impossible in many cases. During flight, the controller/actuator must be operated many times to precisely place the loads, in particular when the paraglider drifts away from a predetermined flight path due to wind, or when the provided landing site cannot be reached due to an excessive loss of height, and an alternate landing site must be targeted.

SUMMARY OF THE INVENTION

The problem of the invention is therefore to provide an actuation system to manoeuvre a load-bearing paraglider and a method to move the control surfaces with minimal energy.

According to the invention, a mechanical actuation system is used where the required force and path as well as the work or output to be applied is obtained from the energy that is released when the distance between the load and the paraglider is shifted. A mechanical transmission causes a comparatively large control force and a comparatively large output to be applied with a comparatively small amount of energy. An advantage of the invention is that the overall system and in particular the control and actuation system have a relatively simple construction so that it is economical to manufacture. Given the simple construction, there is also less effort involved in servicing and repairing the load-bearing paraglider.

BRIEF DESCRIPTION OF THE DRAWING

In the following, the invention will be described with reference to FIGS. 1–9. Shown are.

DETAILED DESCRIPTION

Figure 1:
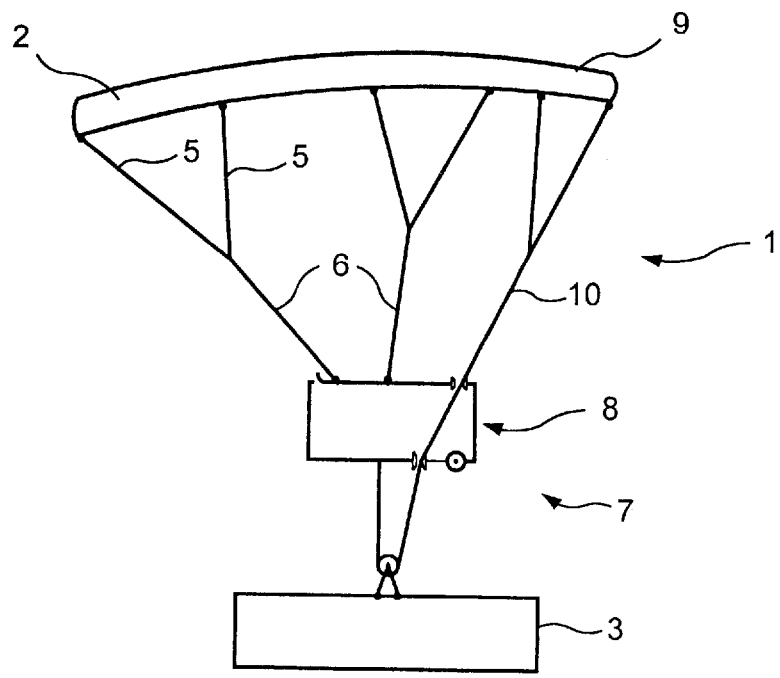
FIG. 1 a side-view of a schematic representation of a load-bearing paraglider with the bearing and adjusting system according to the invention, FIG. 2 the load-bearing paraglider according to FIG. 1 in a rear view, i.e., viewed in the direction of flight, FIG. 3 a first embodiment of the actuating system according to the invention that executes control movements only to land the load-bearing paraglider system, FIG. 4 another embodiment of the actuating system according to the invention that executes control movements for landing and controlling the path, FIG. 5 another embodiment of the actuating system according to the invention that can execute control movements for landing and controlling the path, whereby passive control devices are provided to control the path that use the weight of the load, FIG. 6 a control diagram for the actuating systems according to FIGS. 4 and 5, FIG. 7 another embodiment of the actuating system according to the invention for landing and controlling, whereby the path control is also supported by the weight of the load, FIG. 8 an actuating system according to the invention for controlling landing and the path, whereby the control devices for controlling the path can be coupled to the control devices for controlling landing, FIG. 9 a control diagram for the actuating system according to FIG. 8, FIG. 10 another embodiment of the actuating system according to the invention where the control energy is obtained from a local energy source, FIG. 11 another embodiment of the actuating system according to the invention where the weight of the load can be transmitted by a clutch to the control line, FIG. 12 a side view of another embodiment of the actuator according to the invention with a gear unit with one degree of freedom, FIG. 13 a side view of another embodiment of the actuator according to the invention with a gear unit with two degrees of freedom, FIG. 14 a side view of an embodiment of the actuator according to the invention with a gear unit and motor, FIG. 15 a side view of an embodiment of the actuator according to the invention with an alternative arrangement of cable drums in contrast to FIGS. 12, 13, and 14, FIG. 16 a side view of an embodiment of the actuator according to the invention from FIG. 13 with a gear transmission.
Figure 2:
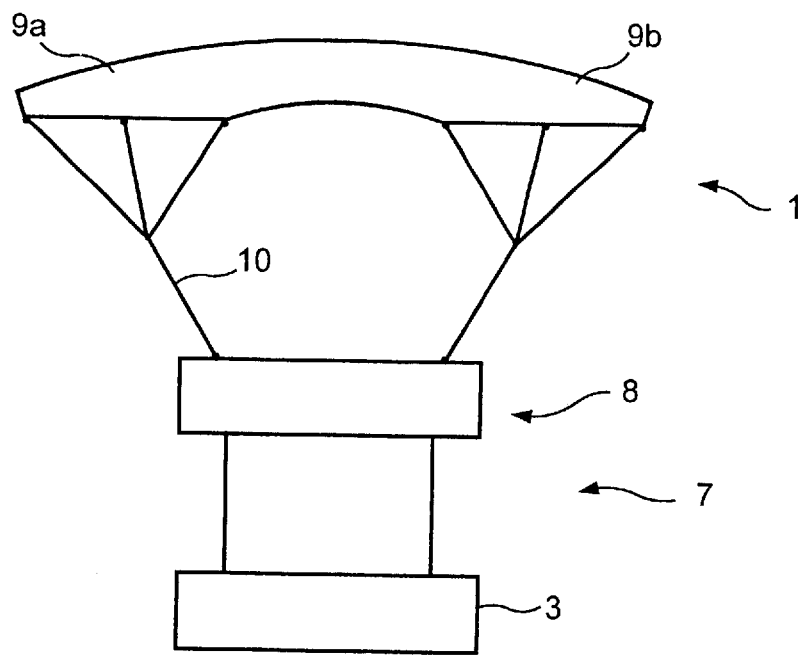

The schematic portrayals in FIGS. 1 and 2 show a load-bearing paraglider 1 with a parachute 2, a carrier or load (termed load unit 3 for short) that is suspended by parachute lift webs or parachute lines 5 as well as by lift webs 6 and the bearing and control system 7 according to the invention with a controller 8 on the load-bearing paraglider 1. The parachute 2 has trailing edges or trailing edge flaps 9, 9a, 9b that can be moved or adjusted via the control lines 10 to control the load-bearing paraglider 1 or influence its landing. In the following, the control system according to the invention will be described in detail with reference to FIG. 3 et seq., whereby components with the same function are given the same reference number.

Figure 3:
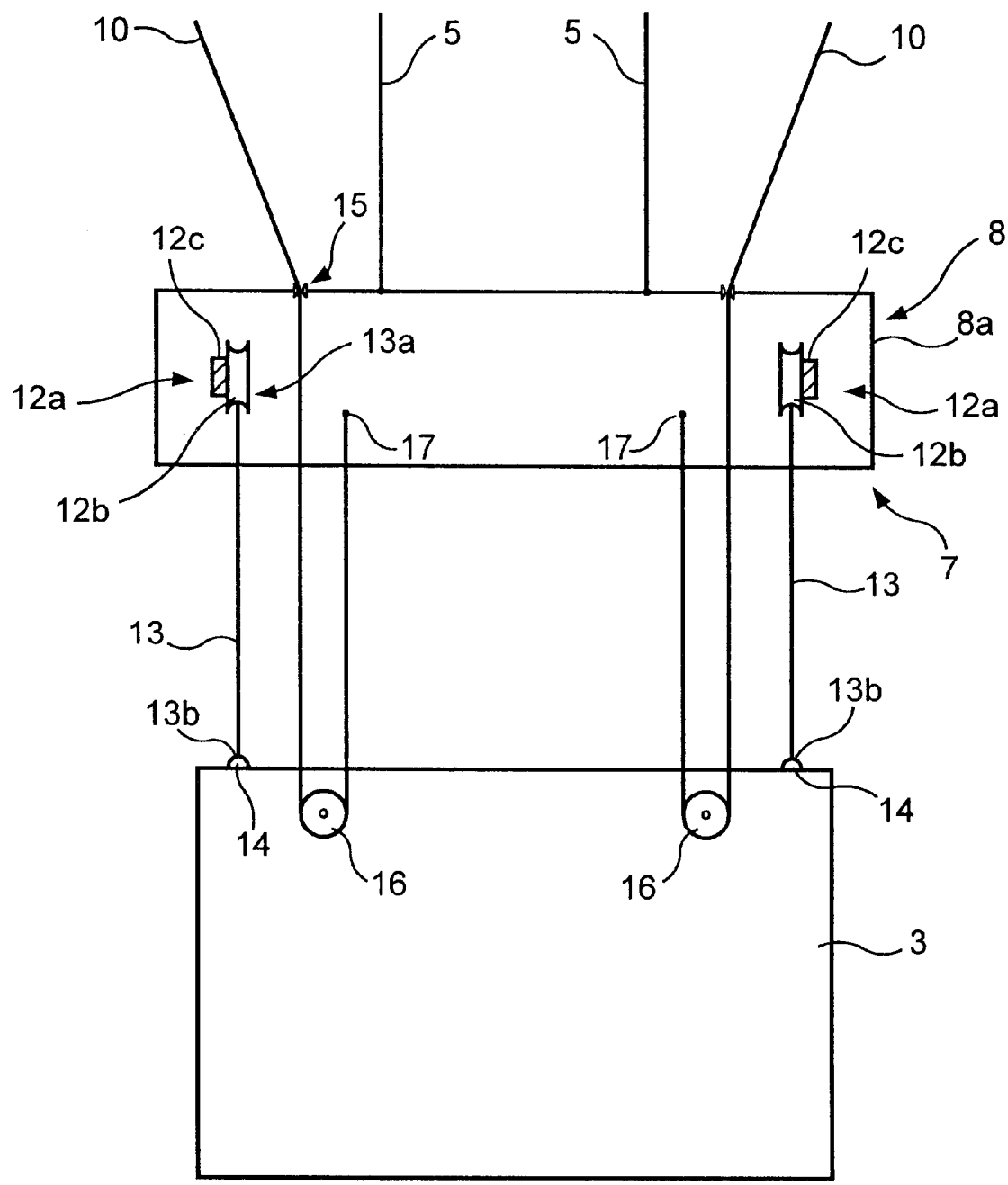

FIG. 3 shows an embodiment of the bearing and control system 7 according to the invention with the carrier 3. The represented embodiment only flattens out or flares the paraglider 1 briefly before touchdown when landing. Both trailing edges 9a, 9b are moved downward as simultaneously as possible, i.e., toward to ground, to cause a brief increase in resistance and set the angle of incidence of the load-bearing paraglider 1. To achieve this flaring movement, both control lines 10 for both trailing edge flaps 9a, 9b must be briefly drawn. The bearing and control system 7 must briefly produce a large force for corresponding control movements. According to the invention, the weight of the carrier or the load 3 is used and transferred to the control line 10. In the embodiment in FIG. 3, the load-bearing paraglider 1 cannot be controlled using the weight of the load 3.

The bearing and control system 7 has a controller 8 that is preferably in a control box 8a.

In the controller 8, there is at least one and preferably several load-unrolling devices 12a preferably on coincident axial lines that comprise a cable drum 12b and a brake 12c. On each cable drum 12b is a line or lift web 13 that can roll off from its first end 13a on the cable drum 12b, and its second end 13b is affixed to a corresponding attachment 14 to the carrier or load 3. The roll-off movement 12a of the cable drum 12b can be stopped with a brake 12c. The roll-off devices 12a are preferably linked to rotate in pairs in the control box 8a. An uneven number of two roll-off devices 12a can be in the control box 8a. They are then arranged in the control box so that they stably hold the carrier or load 3 in a set three-dimensional position. Corresponding state-of-the-art mechanics are to be provided.

Viewed from the parachute 2, each control line 10 runs through a guide 15 optimally located on the controller 8, and from there through the control box 8a to a pulley 16 on or in the carrier 3. The control line 10 is deflected in the opposite direction and runs to a fastener 17 on the control box 8a or the controller 8. By means of this fastener 17 acting as a fixed point, the length of each control line can be set from the respective trailing edge 9a, 9b to the fastener 17. If the distance of the carrier 3 is increased with the roll-off devices 12a to the exit of the fastener 17 above it, the respective trailing edge 9a, 9b is pulled due to the deflection of each control line 10 on the carrier 3.

To flare the paraglider 1 before it sets down, the brakes 12c of each roll-off device are released simultaneously so that the carrier or the load 3 is moved downward from its weight relative to the controller 8. The potential energy of the carrier or load 3 is converted into kinetic energy. Since the control line 10 is attached to the fastener 17 on the controller 8, the trailing edge flaps 9a, 9b are simultaneously drawn downward so that the parachute flares. The arrangement of the pulleys 16 causes the weight of the carrier or load 3 to be converted into a double control force acting on the trailing edge flaps 9a, 9b, whereby the control path is cut in half measured against the relative movement of the carrier or load 3 in relation to the control box 8a. The potential energy of the carrier or load 3 is exploited in this manner to briefly apply a relatively large adjusting force without requiring powerful energy supply systems. Output is only required to actuate, i.e., trigger the brakes 12c.

The embodiment in FIG. 4 hence has control lines 10 connected to the trailing edges 9a, 9b of the parachute (not shown) that run through the controller 8 to the carrier or the load 3 on or in which a corresponding number of pulleys or deflection rollers 16 are provided to deflect the control line 10. The pulley or deflection roller 16 can be outside the carrier or load 3 as shown in FIG. 4, or it can be a component installed in it or them as shown in FIG. 3. From the pulley or deflection roller 16, each control line 10 reaches a drum 63 that is rotatably mounted as a part of the controller 8. The drum 63 is coupled to a brake 64 in the controller 8. In addition, an actuator 65 can drive the drum 63. The brake 64 and possibly the actuator 65 are fed by their own energy supply that is preferably provided in the controller 8 or control box 8a. The bearing and control system 7 in FIG. 4 has an arrangement consisting of the control line 10, pulley or deflection roller 16, drum 63, brake 64 and possibly actuator 65 preferably in pairs, whereby this arrangement can be in more than sets of two, e.g. sets of four or six. The drums 63 are preferably axially coupled at least in pairs. Instead of several brakes 64 and possible several actuators 65, they can be combined to drive several drums 63; one brake 64 may be sufficient per controller 8 and one actuator 65 for several drums 63. The bearing and control system 7 also has several lift webs or load cords 13 to lower the load or carrier 3 in relation to the controller 8 or control box 8a and hence exploit the potential energy of the carrier or load 3 for actuation. The lift web 13 is at least partially rolled up on a roll-of device 12a of the controller 8 as in the embodiment in FIG. 3. The roll-off device 12a comprises a cable drum 12b and a brake 12c. There is at least one roll-off device 12a, whereby preferably several roll-off devices 12a are arranged in pairs. The cable drums 12b are joined axially at least in pairs to prevent the carrier or load 3 from being tilted in relation-to a set initial position. However, a different mechanical clutch and arrangement of these parts according to the state-of-the-art is also conceivable.

The embodiment in FIG. 4 allows the load-bearing paraglider 1 to be controlled and additionally flared by pulling all the trailing edge flaps 9. To cause the load-bearing paraglider to flare, the brakes 12c are merely triggered simultaneously. The lift webs or cords 13 are rolled off of the cable drums 12b so that the load or carrier 3 lowers in relation to the drums. Simultaneously, the drums 63 are locked. This increases the length between the pulley 16 and the drum 63. Since the drums 63 are locked, the free length of the control lines 10 remains constant so that the trailing edges 9, 9a, 9b on the parachute 2 are pulled downward corresponding to the drop path of the load or carrier 3.

Only a few trailing edges 9, 9a or 9b need to be drawn for control; normally to control the paraglider 1 (viewed in the direction of flight) to the right, at least one right trailing edge flap 9a, 9b is pulled, whereby the construction of the parachute 2 and the type of manoeuvre determine which of the trailing edges 9, 9a, 9b are to be drawn. The control line 10 that is connected to the trailing edge 9, 9a, 9b to be pulled is not rolled off of the drum by locking the drum 63 with the brake 64.

However, all the roll-off devices 12a are released so that the carrier or load 3 is lowered relative to the control box 8a. For the control lines 10 that do not draw a trailing edge 9, 9a, 9b, both the control line 10 is rolled off of the associated drum 63, and the associated roll off device 12a is simultaneously actuated to roll off the lift web or the cord connection 13 rolled onto the roll-off device. Due to the pulleys 16, the necessary roll-off movement for the respective control lines 10 of the drum 63 is only one-half as large as the roll-off movement of the lift web 13 from the cable drum 12b so that there is a transmission ratio for the control line 10 of 2:1.

Figure 5:
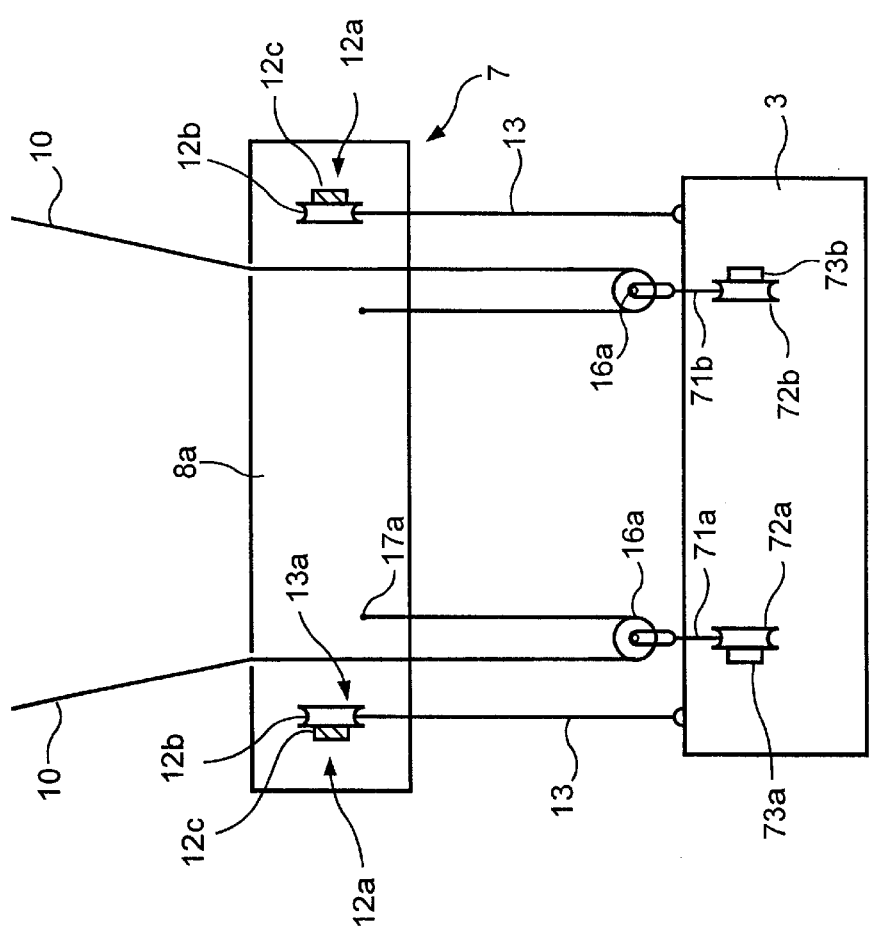

FIG. 5 shows an alternative embodiment of the bearing and control system according to the invention and is suitable to control and flare the paraglider 1. Similar to the embodiment in FIG. 3, a minimum of two control lines 10 of the controller 8 are each guided to a pulley 16a, 16b that deflects each control line 10 whose ends are attached to a fastener 7 on the controller 8. The pulleys 16a, 16b are suspended via a cable connection 71a, 71b on rollers 72a, 72b with brakes 73a, 73b that are rotatably coupled with each other on or in the carrier or load 3. The cable connections 71a, 71b can roll off of the drums 72a, 72b so that the pulleys 16a, 16b are so-called loose pulleys. The carrier or load 3 can be rolled up by at least one lift web 13 on a roll-off device 12a with a cable drum 12b and a brake 12c.

Figure 6:
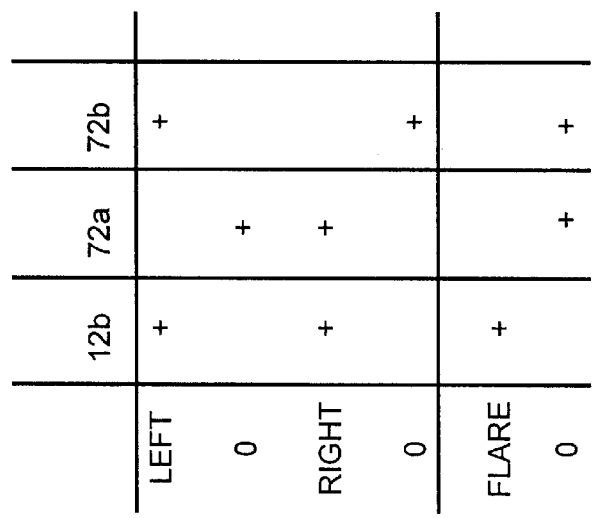

The function of the bearing and control system 7 in FIG. 5 is described with reference to the control diagram in the form of a table in FIG. 6. When the parachute is controlled to move to the left (viewed from the viewer in FIG. 7), the cable drums 12b in the controller 8 are simultaneously released to roll off the lift web 13. In addition, the brake 73b of the right part of the bearing and control system 7 (viewed from the viewer in FIG. 7) is released. The left trailing edge 9 of the parachute 2 is thereby drawn. The potential energy of the load unit 3 is used for the required force. To return from a left curve to a straight flight, the left brake 73a is released so that control line 10 is freed which moves the trailing edge 9a, 9b into its initial position. An analogous control situation results for a right curve and transitioning from a right curve to a straight flight. To flare the load-bearing paraglider 1 using the potential energy of the carrier or load unit 3, all of the cable drums 12b are released while the brakes 73a, 73b are simultaneously blocked. The energy required to control and flare the paraglider 1 is partially drawn from the potential energy of the load unit 3.

Figure 7:
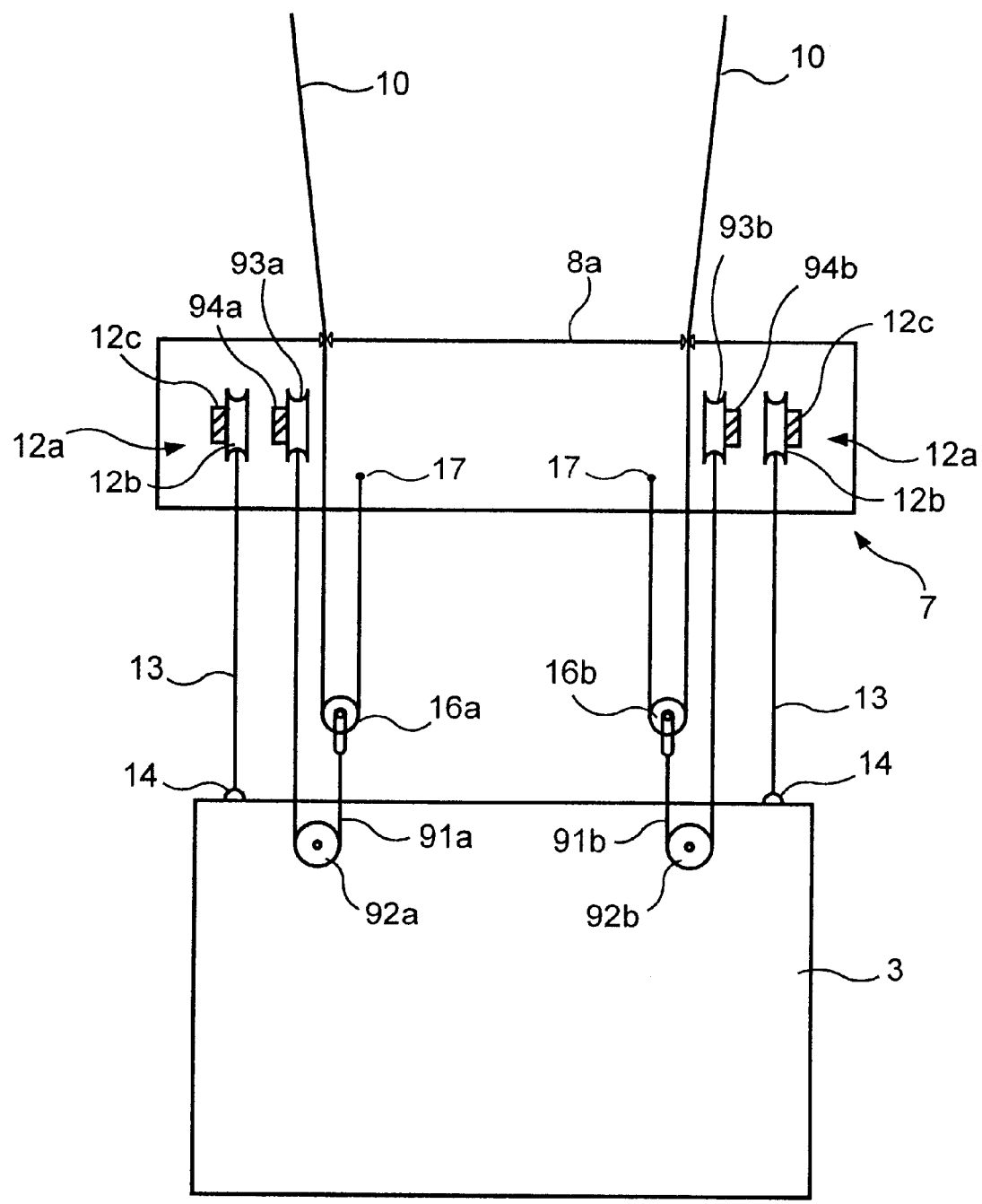

With the bearing and control unit 7 in FIG. 7, the control line 10 running from the respective trailing edge 9, 9a, 9b runs through the controller 8 to a loose pulley 16a, or 16b where it is deflected, and one end is attached to a fastener 17 in the control box 8a. The loose pulleys 16a, 16b are suspended via a cable connection 91a, 91b on a deflection roller 92a, 92b that is axially fixed on the load unit 3. The cable connections 91a or 91b are deflected by the deflection rollers 92a and 92b and run to the controller 8 where there is a brake 94a and 94b. The load unit 3 can be rolled up or down to a greater or lesser degree by means of the fastener 14 on it via at least one lift web 13 on a load roll-off device 12a in the control box 8a with a cable drum 12b and a brake 12c.

The circuit diagram for controlling and flaring the parachute using the potential energy of the carrier or load unit 3 is represented in FIG. 9. Since the control lines 10 are deflected by the floating pulleys 16a, 16b (whose relative position determines the position of the trailing edges 9a, 9b via the length of the cable connections 91a and 91b, and the cable connections 91a and 91b can simultaneously roll off the drums 93a, 93b), the dual pulley realized thereby results in a force transmission ratio of 1:4 in reference to the rolled-off lift web 13.

Alternatively, each control line 10 can be directly rolled off drum 101a or 101b as shown in the embodiment in FIG. 8 without being deflected by a pulley. There is a brake 102a, 102b on the drums 101a, 101b. The lift webs 13 are rolled on load roll-off device 12a with cable drum 12b. Additional there is a third drum 103a rotatably mounted in the controller 8. This also has a brake 104a, 104b. The load roll-off device 12a, the drums 101a, 101b, 103a, 103b with the associated brakes 102a, 102b and 104a, 104b are at least in pairs in the controller 8 to ensure the set three-dimensional alignment of the load unit 3. The parachute lines or lift webs 5 are rolled onto drums 101a, 101b in the embodiment in FIG. 8 while the control lines 10 are rolled onto drums 103a, 103b. The control lines 10 run from the parachute through a guide 15 and are then deflected by a pulley 16 in the opposite direction to another pulley 105 that is between the controller 8 and the parachute 2, but preferably between the controller 8 and the guides 15. The pulley 16 and the other pulley 105 are preferably fixed by means of webs and fasteners against the force of the cable. From the other pulley 105 runs the control line 10 to the drum 103a and 103b. In the embodiment in FIG. 8, there are only fasteners 106a, 106b for the load unrollers 12a and fasteners 107a, 107b for each other pulley 16 on the load unit 3.

FIG. 9 is a control diagram for the brakes 12c, 103a and 103b, 104a and 104b to control the load-bearing paraglider 1 to the right and left and to execute flare manoeuvres. For example, to control the paraglider to turn left, i.e., to draw the left control line 10 (for the viewer of FIG. 8), the brakes 12c are simultaneously lifted to lower the load unit 3 in relation to the controller 8. Simultaneously, the left drum 103a is locked, and the right drum 103b is released. In this manner, the left control line 10 is drawn while the right control line 10 does not experience any additional tensile force. To stop the control manoeuvre, the brake devices 12c are locked, the brake 104a is released, and brake 104b is locked. When flaring, both brakes 12c are released, and the brakes 104a, 104b are simultaneously locked. To stop flaring, all brakes 12c are locked and the brakes 104a, 104b are lifted.

Figure 10:
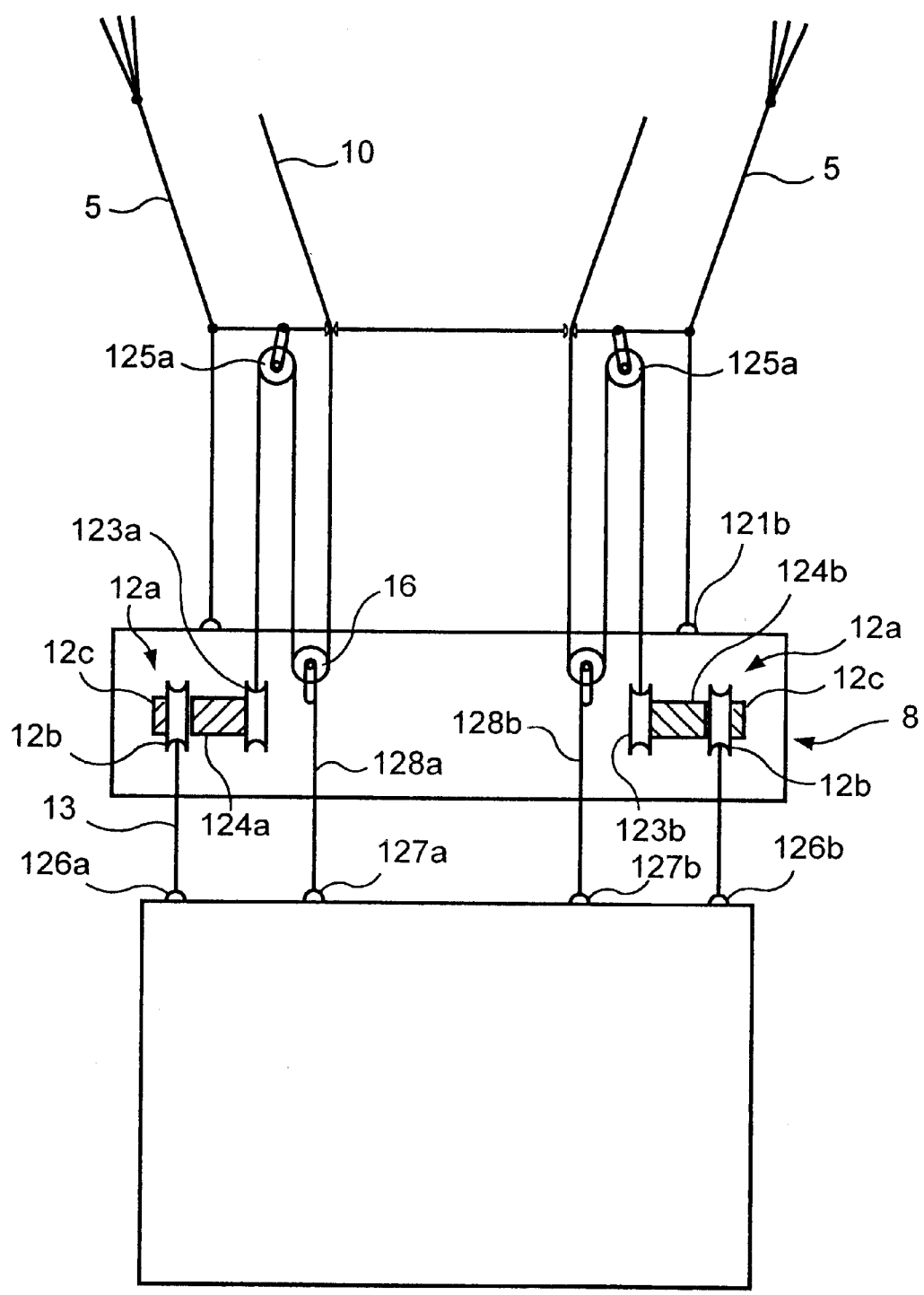

In the embodiment in FIG. 10, the energy for the control movements is taken from a dedicated energy supply. For flaring the parachute, the potential energy of the load unit 3 is used, however. The lift webs 5 of the load-bearing paraglider 1 are attached with fasteners 121a, 121b to the controller 8. Each load unroller 12a with the cable drum 12b and the brake 12c hold the carrier and load unit 3 via the unrollable lift webs 13 and the fasteners 126a, 126b. The control lines 10 pass from the parachute 2 to one pulley 16 each that is suspended via a fastener 127a, 127b and a line 128a, 128b to the carrier or load unit 3. From there, each control line 10 passes to another pulley 125a, 125b and from there to a drum 123a, 123b to which is connected an actuator 124a, 124b with a brake. The actuator 124a, 124b and its brake are fed via an energy supply (not shown) that can be electrical, hydraulic or pneumatic. When the parachute is flared, the load unrollers 12a are simultaneously released while the brakes that are assigned to the drums 123a, 123b are lifted. Since the cable drums 12b (only for this method?) are axially coupled to the drums 123a and 123b, the potential energy of the carrier or load unit 3 is used at the start of the flaring procedure, and a transmission ratio of 1:4 results in reference to the control line 10. For curved flight manoeuvres, those control lines 10 are rolled up by means of the respective actuator 24a and 24b whose assigned trailing edge 9, 9a, 9b is pulled. The energy required for the roll-up movement is taken from a state-of-the-art energy supply (not shown).

Figure 11:
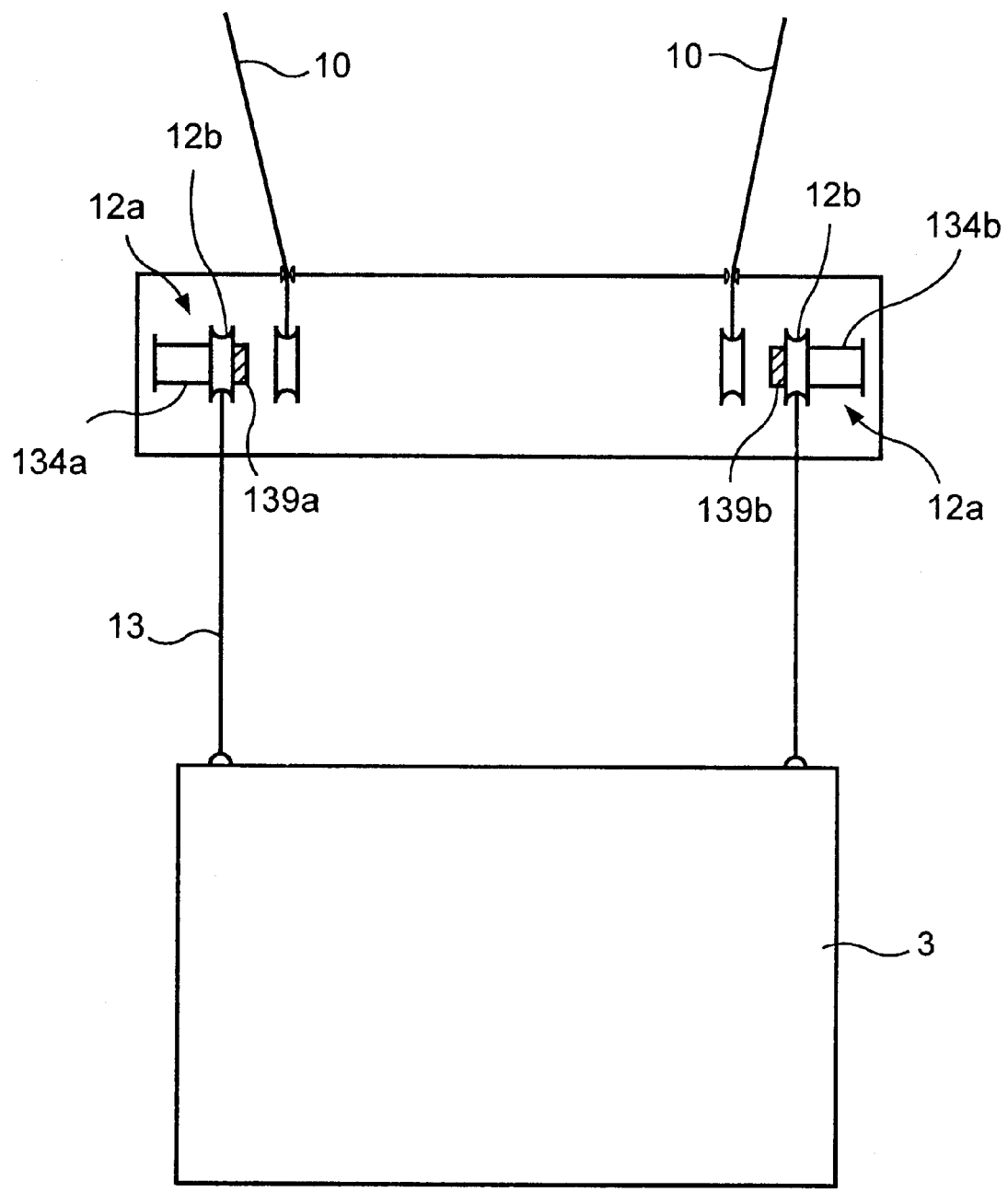

In the embodiment in FIG. 11, the control line 10 passes from the paraglider 2 via a guide 15 and, in contrast to the embodiment in FIG. 10, not to a pulley 16 but directly to a drum 133a, 133b. The load unit 3 can be rolled off of a load unroller 12a via lift webs 13. The load unrollers 12a are axially coupled at least in pairs. Each load unroller 12a is assigned an actuator 134a or 134b that is capable of locking the cable drum 12b of the load unroller 12a and rolling the lift web 13 onto the cable drums 12b. Between each load unroller 12a and drum 133a and 133b is a brake with a clutch 139a and 139b. The drums 133a, 133b are arranged in the controller 8 to be axially movable so that they can be engaged via clutches 139a and 139b to the actuator 134a, 134b.

To make the parachute flare, both drums 133a, 133b are engaged with the clutch 139a, and 139b, and the brakes assigned to the cable drums 12b are lifted. To change direction, e.g. make a curve, those drum 133a, 133b (whose control line 10 is pulled to move the associated trailing edge 9, 9a, 9b) is engaged with the associated clutch 139a and 139b, and both brakes assigned to the cable drums 12b are lifted.

Figure 12:
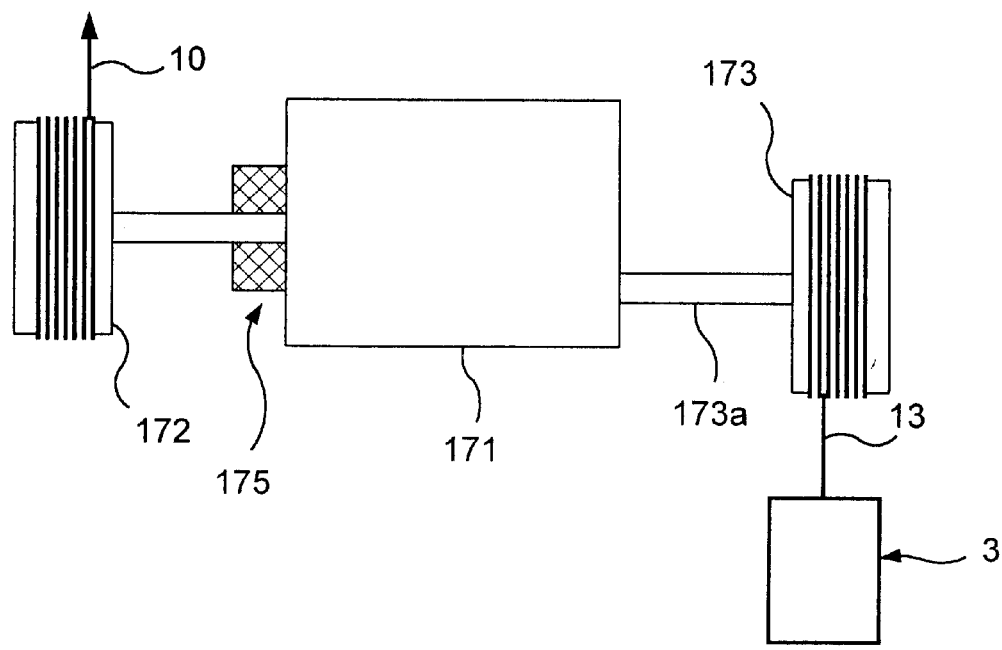

To flare and control the paraglider, the following alternative actuation system embodiments according to the invention are possible:

The embodiment of actuation system according to the invention in FIG. 12 has a gear unit 171 that is between a cable drum 172 to receive or roll off the control line 10 and between a cable drum 173 that can lower the load unit 3 via line 13. The cable drum 172 can be stopped or released with a brake 175. The gear unit 171 has only one degree of freedom, i.e., it is only used to convert the potential energy released when the load unit 3 is lowered into a corresponding tensile force in the control line 10.

Figure 13:
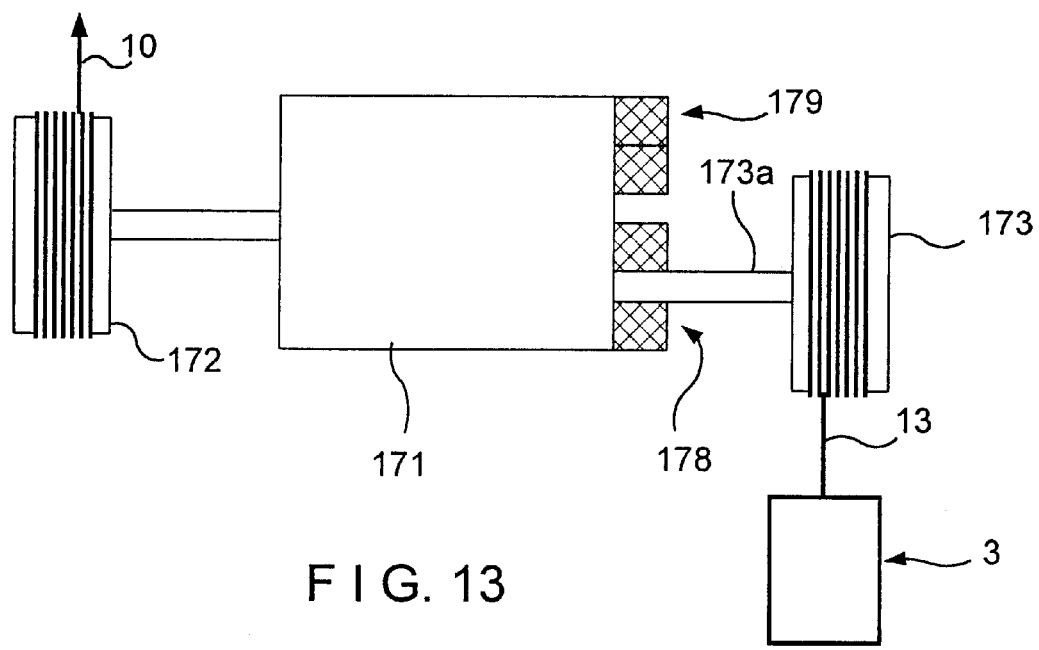

The embodiment in FIG. 13 also has a cable drum 172 for the control line 10 that is engaged with a gear unit 171 with two degrees of freedom. The gear unit 171 is equipped with two brakes 178, 179. Brake 178 is assigned a shaft on which the cable drum 173 is located. Line 13 is rolled onto cable drum 173 for rolling on or off the load unit 3. The gear unit 171 can be designed as planetary gearing. The brake 179 serves to hold or release the control line 10. When at rest, the brakes 178, 179 are held. To pull down the parachute trailing edge 9, the brake 178 is released. The parachute can be thereby controlled and flared in the described manner. Brake 178 is locked when the trailing edge reaches the desired position. The trailing edge 9 is returned to its neutral position by the releasing brake 179, and force from air causes the parachute trailing edge 9 to return to position.

The embodiment of the actuation system according to the invention in FIG. 14 has a gear unit 171 with two degrees of freedom as the embodiment in FIG. 13. The gear unit is assigned a motor 181, preferably an electric motor, that can actuate the cable drum 173 with the line 13 and the load unit 3 via the gear unit 171. There is only one brake 182 on the gear unit 171 that acts on the shaft 173a. The arrangement in FIG. 14 serves to quickly pull down the parachute trailing edge 9 by the weight of the load unit 3 (flaring), and the control movements are generated by the motor 181. When the brake 182 is locked, the control movements are transferred from the motor 181 via the gear unit 171 to the cable drum 173. By reversing the rotational direction, the parachute trailing edge 9 is returned to its original position. The parachute is flared to land by releasing the brake 183 while the motor is resting. The load unit 3 now serves as the drive and causes the parachute trailing edge 9 to be quickly pulled down via the gear unit 171.

The embodiment in FIG. 15 shows an alternative embodiment for the cable drum 172 and cable drum 173 in contrast to FIG. 12, 13, and 14. The cable drums 172, 173 are adjacent, i.e., the gear unit 171 is not between them. The shaft 173a is designed hollow, and the shaft connected to the cable drum 172 runs through it.

An embodiment of the gear unit 171 taken from the embodiment in FIG. 13 is shown in FIG. 16. The gear unit 171 is designed as a gear transmission and is suitable for controlling and flaring.

What is claimed is:

1. A bearing and control system for executing flaring and curved flight maneuvers of a load-bearing paraglider comprising a parachute having trailing edge portions for executing said maneuvers, control lines connected to said trailing edge portions, a load unit, said control lines being respectively wound on first unrolling devices for winding and unwinding the control lines thereon as said paraglider undergoes said maneuvers, a controller interposed between said parachute and said load unit, lift lines connected to said load unit and to further unrolling devices for unwinding therefrom to lower the load unit by its own weight such that the trailing portions of the parachute are pulled down to execute the flaring maneuver and a gear unit with associated brake means between the unrolling devices of the control lines and the further unrolling devices of the lift lines, said gear unit having two degrees of freedom, said brake means comprising two brake members to separately control the parachute in flight and flare of the parachute upon landing.

2. A bearing and control system for executing flaring and curved flight maneuvers of a load-bearing paraglider comprising a parachute having trailing edge portions for executing said maneuvers, control lines connected to said trailing edge portions, a load unit, said control lines being respectively wound on first unrolling devices for winding and unwinding the control lines thereon as said paraglider undergoes said maneuvers, a controller interposed between said parachute and said load unit, lift lines connected to said load unit and to further unrolling devices for unwinding therefrom to lower the load unit by its own weight such that the trailing portions of the parachute are pulled down to execute the flaring maneuver and a gear unit with associated brake means between the unrolling devices of the control lines and the further unrolling devices of the lift lines, said gear unit having two degrees of freedom, said brake means including at least one brake which acts on the further unrolling devices to produce flare of the parachute, and a motor which acts on the gear unit to control the paraglider in flight.

3. A bearing and control system for executing flaring and curved flight maneuvers of a load-bearing paraglider comprising a parachute having trailing edge portions for executing said maneuvers, control lines connected to said trailing edge portions, a load unit, said control lines being respectively wound on first unrolling devices for winding and unwinding the control lines thereon as said paraglider undergoes said maneuvers, a controller interposed between said parachute and said load unit, lift lines connected to said load unit and to further unrolling devices for unwinding therefrom to lower the load unit by its own weight such that the trailing portions of the parachute are pulled down to execute the flaring maneuver and a gear unit with associated brake means between the unrolling devices of the control lines and the further unrolling devices of the lift lines, said gear unit including a gear transmission and a cable-operated transmission which act together or alone.

4. A bearing and control system for executing flaring and curved flight maneuvers of a load-bearing paraglider comprising a parachute having trailing edge portions for executing said maneuvers, control lines connected to said trailing edge portions, a load unit, said control lines being respectively wound on first unrolling devices for winding and unwinding the control lines thereon as said paraglider undergoes said maneuvers, a controller interposed between said parachute and said load unit, lift lines connected to said load unit and to further unrolling devices for unwinding therefrom to lower the load unit by its own weight such that the trailing portions of the parachute are pulled down to execute the flaring maneuver and a gear unit with associated brake means between the unrolling devices of the control lines and the further unrolling devices of the lift lines, in which each of said first unrolling devices comprises a first cable drum on said controller on which a respective one of said control lines is wound, and each of said further unrolling devices comprises a second cable drum on said controller on which a respective one of said lift lines is wound, said gear unit comprising a first gear connected to said first cable drum, a second gear in mesh with said first gear and connected to said second cable drum, said brake means comprising a first brake member for selective braking of said first cable drum and a second brake member for selective braking of said second cable drum.

5. A bearing and control system according to claim 4 wherein said gear unit comprises a shaft supporting said second gear, said first brake acting on said shaft, said second brake acting on said second cable drum.

6. A method to adjust the trailing edge portions of a load-bearing paraglider to produce flaring and curved maneuvers by a bearing and control system having a first unrolling device on which are wound control lines connected to said trailing edge portions, a load unit, and a second unrolling device to unroll lift lines wound therein to lower a load unit, said method comprising executing the flaring and curved fight maneuvers by adjusting the trailing edge portions by the weight of the load unit via a gear unit and brake between the control lines and the load unit, said brake having released and locked states in which said brake acts selectively to produce (a) lowering of the load unit by its own weight concurrently with wind-up of the control lines to effect flaring movement of the parachute and (b) stopping the lowering of the load unit respectively.

7. The method of claim 6 further comprising driving the gear unit to raise up the load unit and unwind the control lines.

8. The method of claim 7 further comprising selectively applying a second brake on said gear unit to secure the load unit.

* * * * *